Nov. 19, 1957  E. E. H. WILDE  2,814,006
DIGITAL TO ANALOG CONVERTER
Filed May 17, 1956  3 Sheets-Sheet 1

INVENTOR.
EDWARD E. H. WILDE
BY Wade Koonty
ATTORNEY
Alfred L. Brody
AGENT

Nov. 19, 1957

E. E. H. WILDE 2,814,006

DIGITAL TO ANALOG CONVERTER

Filed May 17, 1956

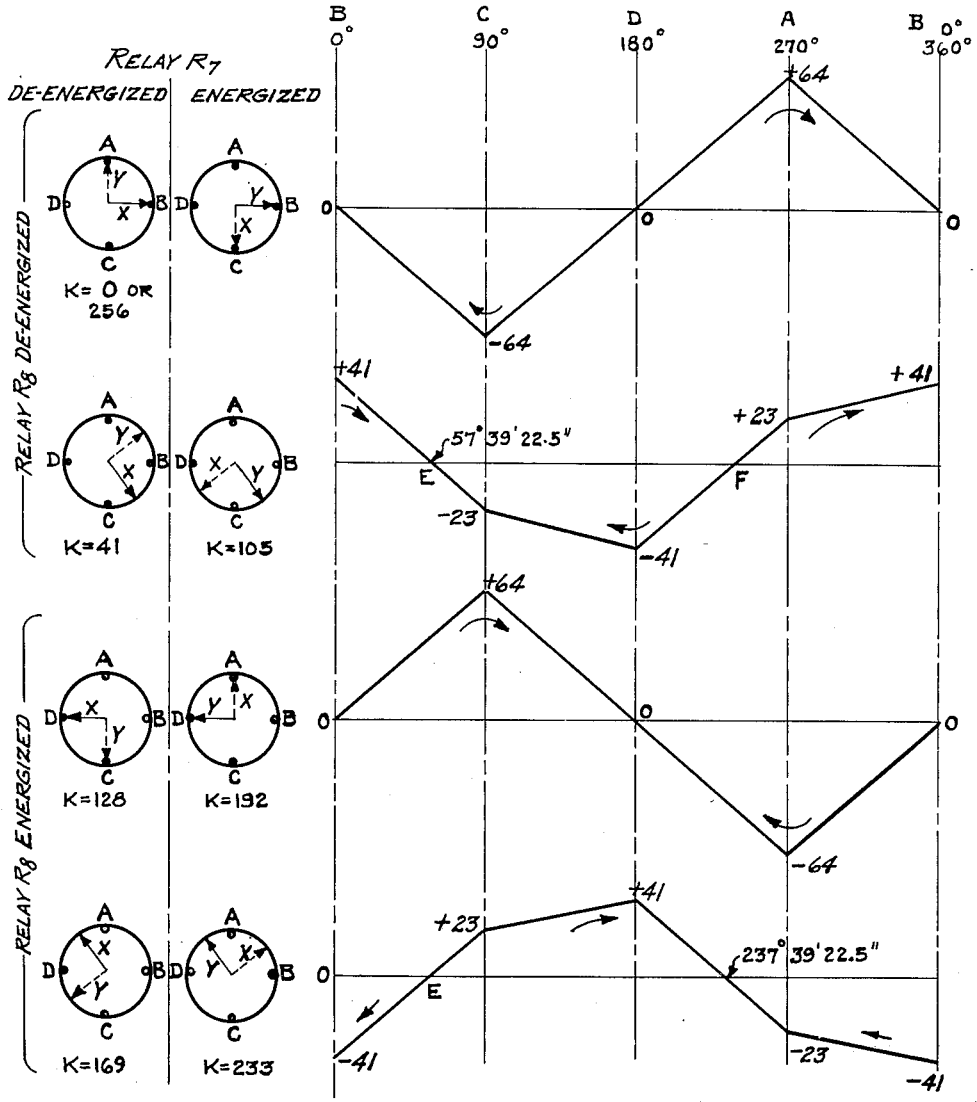

VARIATION OF POTENTIAL ALONG COMMUTATOR WINDING
FOR VARIOUS VALUES OF K.

1. DOTTED LINES IN CIRCLES INDICATE ARM MOMENTARILY DISCONNECTED TO SERVO AMPLIFIER.
2. ARROWS IN VOLTAGE PATTERNS INDICATE DIRECTION IN WHICH THE ARM CONNECTED TO THE SERVO AMPLIFIER WILL BE MOVED BY THE DRIVE MOTOR WHEN THE ARM IS OFF THE POINT OF ZERO POTENTIAL.
3. VOLTAGE VALUES SHOWN ARE RELATIVE.

Fig. 2

INVENTOR.
EDWARD E. H. WILDE
BY
ATTORNEY
Alfred L. Brody
AGENT

Nov. 19, 1957     E. E. H. WILDE     2,814,006

DIGITAL TO ANALOG CONVERTER

Filed May 17, 1956     3 Sheets-Sheet 3

INVENTOR.
EDWARD E. H. WILDE

United States Patent Office 2,814,006
Patented Nov. 19, 1957

2,814,006

DIGITAL TO ANALOG CONVERTER

Edward E. H. Wilde, Wiesbaden, Germany, assignor to the United States of America as represented by the Secretary of the Air Force Application May 17, 1956, Serial No. 585,594

12 Claims. (Cl. 318—28)

(Granted under Title 35, U. S. Code (1952), sec. 266)

The invention described herein may be manufactured and used by or for the United States Government for governmental purposes without payment to me of any royalty thereon.

The present invention relates to a binary digital to shaft transducer and more particularly to such a transducer wherein the binary digital representation of a number is converted into a voltage proportional to the number and wherein said voltage, in turn, is used to fix an angular shaft position, measured in degrees, which bears a direct linear relationship to the number. The device comprises a continuous linearly wound commutator with four taps, spaced 90° apart, for applying said voltage thereto, and two contact arms which are spaced 90° apart and which are insulated from one another. Selective operation of a plurality of relays inserts in circuit selective secondary windings of a transformer, wherein each of said windings induces a voltage, different from one another and of predetermined value, and wherein the additive voltage of the secondary windings, in circuit, is applied to the taps on the commutator. The position of the contact arm, in circuit, gives an angular reading representative of the number.

The relays are actuated by voltage signals received from a counting circuit, not a part of this device, which in turn is actuated by coded pulse signals. Said coded pulse signals may be transmitted, for example, from the ground to control an aircraft in flight, which is provided with a transducer as described herein, or said signals may be used for the operation of any number of remote control devices, comprising such a transducer.

One feature of the present invention is that a pulse signal may be accurately converted, by means of different voltages obtained from a plurality of differently wound transformer secondary windings, from a binary digital representation to a linearly proportional angular position of the rotor of a servo drive motor.

Another feature of the present invention is a linearly wound commutator having four taps spaced 90° apart and a pair of arms spaced 90° and insulated from one another, wherein each alternately spaced pair of taps is connected to a bank of differently wound transformer secondary windings of predetermined output voltages.

Still another feature of the present disclosure is a shuttle relay which selectively connects either of the commutator arms to a servo amplifier which, in turn, operates a servo drive motor and a common shaft between the servo drive motor and the apex of the commutator arms, whereby said arms are rotated until a null position is reached from each digital representation.

An additional feature of the present invention is a phase reversing relay which changes the shaft position by 180° and thereby corresponds to the binary digit which equals one-half the total count, regardless of the number of relays used.

Other features and objects of the invention will be apparent from a detailed description of the invention and from the appended drawings and claims.

In the drawings:

Fig. 2 is a graphic representation of the variations of voltages for the four commutator taps corresponding to different numbers from 0 through 256, and shows the positions of the arms taken as a result of the voltage pattern;

Figure 1:
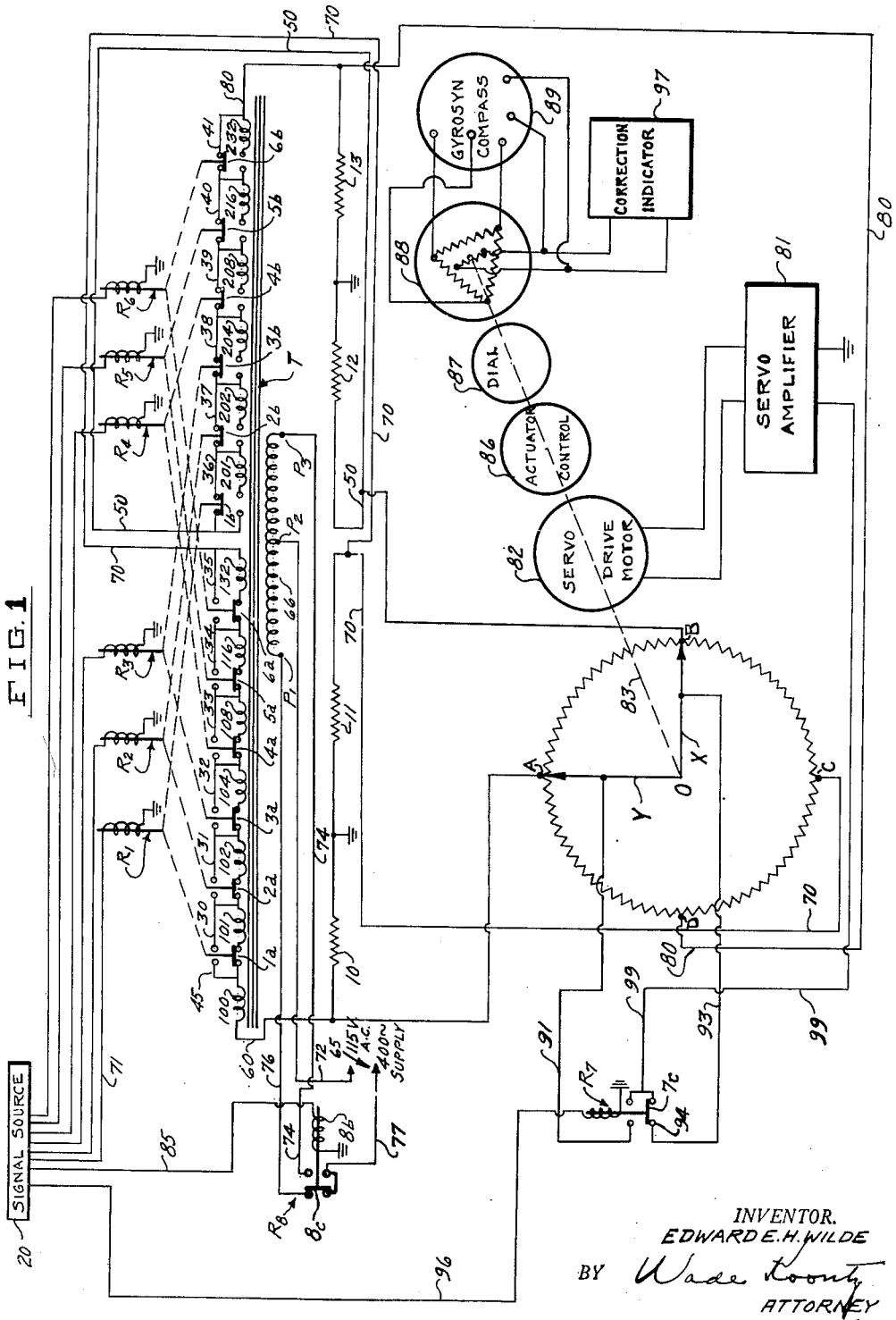
Fig. 1 is a schematic diagram of the complete circuit of the invention.

The invention as disclosed in the drawings and description, requires a signal source 20 which converts a series of pulses representing a number into a binary representation of said number. Such devices are well known in the art and the specific details thereof form no part of the present invention. The binary representation appears in the form of voltage signals applied to such of the relays R1 through R8, as have corresponding binary designations. The pulses are initially received by said signal source from some form of transmitter (not shown).

Figure 4:
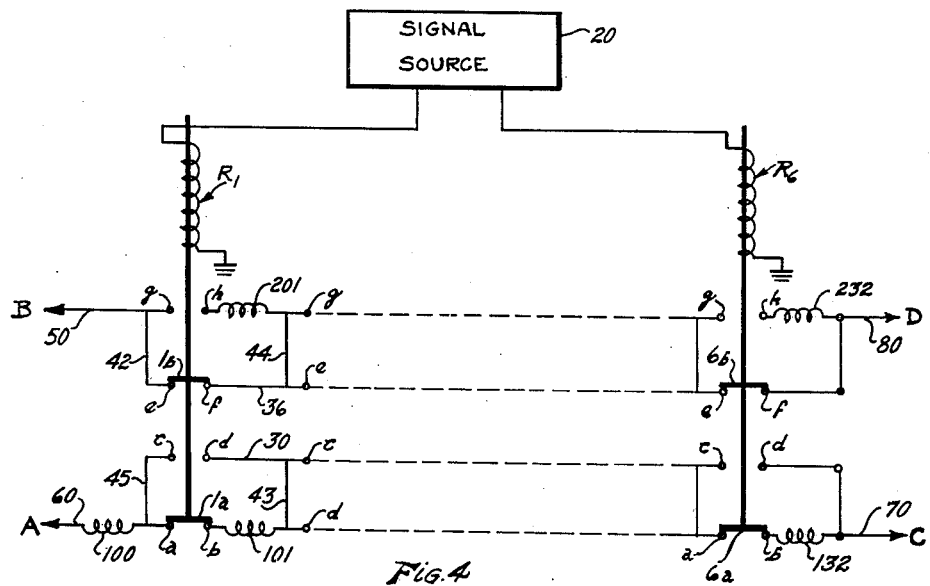
Fig. 4 is an electrical equivalent circuit of relays R1 through R6, and the secondary transformer windings portion of the circuit as shown in Fig. 1.

Each of relays R1, R2, R3, R4, R5 and R6 are DPDT relays and may alternately connect in circuit either one of two secondary windings of a transformer T. For example, when the coil of relay R1 is not energized (see Figs. 1 and 4), bridge element 1a of relay R1 will engage its contact points a and b to insert secondary winding 101 in the circuit and open the circuit across contacts c and d of relay R1. However, simultaneously the bridge element 1b of relay R1 will engage its contact points e and f to complete a connection from line 50, through by-pass line 42 across bridge element 1b, through secondary by-pass line 36 to either by-pass line 44 and point g, or to point e of the next relay R2, depending upon the position of bridge element 2b. In the latter case, the points g and h of relay R1 between main line 50 and secondary winding 201, are not connected by bridge element 1b.

If, however, the coil of relay R1 is energized, the bridge elements 1a and 1b will be raised so that secondary winding 101 would be by-passed through said points c and d and line 30 to either line 43 and either point a or c of the next relay R2, depending upon the position of bridge elements 2a and 2b of said relay R2. At the same instant, element 1b engages points g and h, and secondary winding 201 would then be in circuit.

In view of the foregoing, it follows that the bistable positions afforded by de-energizing or energizing relay R1 will insert either secondary winding 101 or 201 in circuit. Relays R2, R3, R4, R5 and R6 are each similarly bistably connected and disconnected to its respective pair of secondary windings 102 and 202, 104 and 204, 108 and 208, 116 and 216, and 132 and 232.

Windings 100, 101, 102, 104, 108, 116 and 132 may be connected in series when each of relays R1, R2, R3, R4, R5 and R6 is de-energized so that bridge elements 1a, 2a, 3a, 4a, 5a and 6a, each complete a circuit between adjacent windings on either side of each of said elements. If relays R1 to R6 are all energized, then the circuit would run from main line 60 through winding 100, through by-pass line 45, bridge element 1a, by-pass line 30, bridge element 2a, line 31, bridge element 3a, line 32, bridge element 4a, line 33, bridge element 5a, line 34, bridge element 6a, line 35 to main line 70 (see Fig. 1). Of course, any combination of relays R1 to R6 may be de-energized or energized so that various combinations of windings 101, 102, 104, 108, 116 and 132 may be in circuit or by-passed.

Conversely, windings 201, 202, 204, 208, 216 and 232 may be connected in series when each of relays R1 to R6 are energized so that bridge elements 1b, 2b, 3b, 4b, 5b and 6b each complete a circuit between adjacent windings on either side of each of said elements. If relays R1 to R6 are all de-energized, then a circuit would be completed through main line 50, by-pass 42, bridge element 1b, line 36, bridge element 2b, line 37, bridge element 3b, line 38, bridge element 4b, line 39, bridge element 5b, line 40, bridge element 6b, line 41 and main line 80. In addition, any combination of relays R1 to R6 may be energized or de-energized so that various combinations of windings 201, 202, 204, 208, 216 and 232 may be placed in circuit or be by-passed.

The aforementioned secondary windings are differently wound so as to selectively provide output voltages of magnitudes proportional to a binary digital representation. That is, windings 100, 101, and 201 are each wound to provide an output voltage of magnitude 1E, windings 102 and 202 are each wound to provide a voltage of magnitude 2E, windings 104 and 204 are each wound to provide a voltage of magnitude 4E, windings 108 and 208 are each wound to provide a voltage of magnitude 8E, windings 116 and 216 are each wound to provide a voltage of magnitude 16E, and windings 132 and 232 are each wound to provide a voltage of magnitude 32E.

It is well known that numbers may be expressed by binary digital representations or codes, so that any desired number may be built up as a sum of powers of the number 2. Thus, for example, the number 25 may be expressed as $1 \times 2^4 + 1 \times 2^3 + 0 \times 2^1 + 1 \times 2^0$. The 0's and 1's preceding each of the aforestated algebraic expressions designate, respectively, the secondary windings which are "out" or "in" circuit.

In the present invention relay R1 corresponds to the binary number $2^0(1)$, R2 to $2^1(2)$, R3 to $2^2(4)$, R4 to $2^3(8)$, R5 to $2^4(16)$, and R6 to $2^5(32)$. It follows then that the bistable positions inherent to relays R1 through R6, may insert in one circuit an additive voltage of any desired magnitude ranging in integral steps from $0 \times E$ to $63 \times E$, and at the same time said relays may decrease the voltage in the other circuit by the same amount. The secondary 100, which has a voltage of magnitude $1 \times E$, is always in circuit regardless of the positions of any of the relays.

Figure 3:
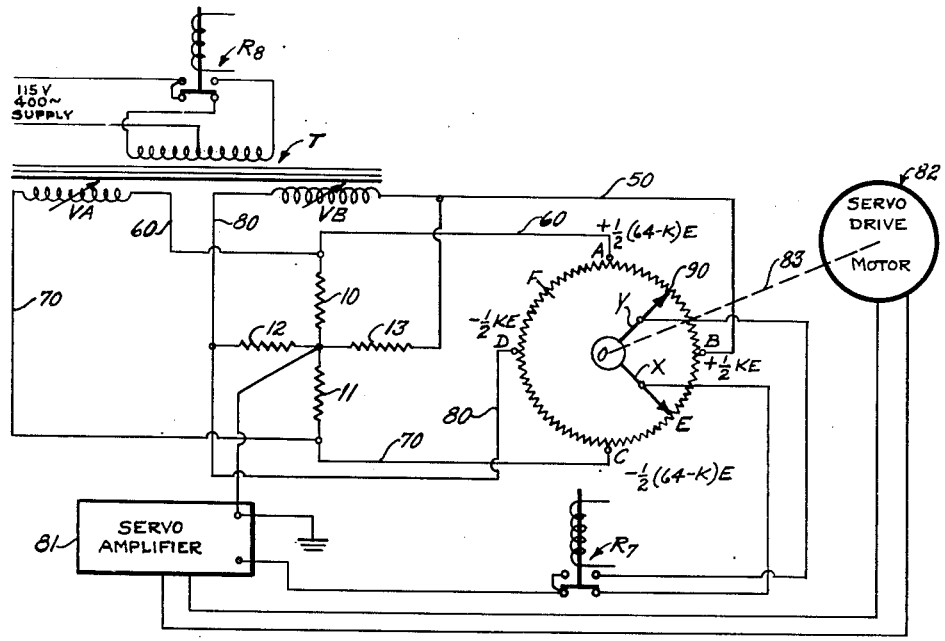
Fig. 3 is an electrical equivalent circuit of the commutator and servo drive portion of the circuit as shown in Fig. 1.

Windings 100, 101, 102, 104, 108, 116 and 132, any number of which may be in series to one another through relays R1 through R6, and which may be collectively designated as variable voltage VA (see Fig. 3), are connected to commutator 90 at tap A through line 60 at one end and at tap C through line 70 at the other end, spaced 180° from tap A along the periphery of the commutator 90 (see Figs. 1 and 3). This voltage varies from $64 \times E$ to $1 \times E$. It is also connected to ground through resistors 10 and 11.

Windings 201, 202, 204, 208, 216 and 232, any number of which may be connected in series and which are collectively designated as variable voltage VB (see Fig. 3), are connected to commutator 90 at tap B through line 50 at one end, spaced 90° clockwise from tap A, and conected at tap D through line 80 at the other end and spaced 90° clockwise from tap C. This voltage varies from 0 to $63 \times E$. It is also connected to ground through resistors 12 and 13.

It is obvious that due to the mutually reciprocal action of relays R1 to R6, variable voltages VA and VB will always share a constant total voltage or, in other words, said voltages VA and VB will always "cross-complement" on another.

The commutator 90 comprises a linearly wound potentiometer having two arms X and Y (instead of the conventional single arm potentiometer), pivoted at its pivot member 0, fixed 90° apart and insulated from one another. The outer ends of said arms X and Y are free to move as a unit to make contact along the windings of said potentiometer; however, in all positions said arms remain spaced 90° apart from one another. Arm Y is connected by wire 91 to upper contact point 92 of SPST or shuttle relay R7 and arm X is connected through line 93 to lower contact point 94 of relay R7.

In the de-energized condition of relay R7, the servo amplifier 81 is connected to arm X through lead 99, the bridge element 7c, and lead 93. Transmission of voltage from the signal source 20 over lead 96 causes relay R7 to operate, transferring the servo amplifier 81 to arm Y, the conection now being over lead 99, the bridge element 7c, and lead 91. In other words, the position of bridge element 7c will complete a circuit from either arm X or Y through the relay R7 to the servo amplifier 81, to operate servo drive motor 82. The selective switching of bridge element 7c will provide a commutation action between arms X and Y to cause a shaft movement of 90°.

Fig. 3 shows an equivalent circuit of applicant's device where commutator 90, together with resistors 10, 11, 12, and 13 form a voltage apportioning network. As stated before, application to the counting circuit of a coded signal corresponding to a number K, where K may be any integer from 0 to 63, inclusive, will cause voltages to be applied to the necessary relays R1 through R6, to cause variable voltage VB to assume a value $K \times E$. At the same time variable voltage VA assumes a value $(64-K)E$. Resistors 10 and 11 are equal and, therefore, the voltage drops from A to ground and from C to ground will always be equal to each other in magnitude, and each of said voltage drops is equal in magnitude to one-half the value of the voltage drop from A to C, but opposite in polarity. Similarly, resistors 12 and 13 are equal and the voltage drops from B to ground and D to ground will each be equal to each other and each of said voltage drops is equal in magnitude to one-half the voltage drop from B to D, but also of opposite polarity. If voltages having the same polarity is that at A are called positive and those 180° out of phase are called negative, then with respect to the common grounded junction point of resistors 10, 11, 12, and 13, the voltage at A may be said to be $+\frac{1}{2}(64-K) \times E$; that at C, $-\frac{1}{2}(64-K) \times E$; that at B, $+\frac{1}{2}K \times E$; and that at D, $-\frac{1}{2}K \times E$. The voltage drop from B to C will always be $+\frac{1}{2} \times 64E$, and that from D to A will always be $-\frac{1}{2} \times 64E$. Since points B and C are at potentials of opposite polarity, there must be some point, E, on the commutator 90 between points B and C, where the potential with respect to ground is zero. The voltage drop from B to E is $+\frac{1}{2}K$. Since the commutator is linearly wound voltage drops Therefore, $+\frac{1}{2}K$ is to $\frac{1}{2} \times 64K$ as the angle $\sphericalangle$BOE is to 90° and, therefore, angle $$\sphericalangle BOE = \frac{K}{64} \times 90° \text{ or } \frac{K}{256} \times 360°$$

Similarly, there is another point F, 180° from E, where the potential with respect to ground is zero. The entire portion of the commutator 90 from F through A, and B to E is positive, while the entire portion from F through D, and C to E is negative. The servo amplifier 81 is connected to the arm X and ground. It is so arranged that when the voltage drop from arm X to ground is positive, the arm is rotated clockwise by the drive motor and, when the voltage drop is negative, the arm is rotated counter-clockwise. The action of the servo system will, therefore, cause the arm X to seek point E, rather than point F, and remain there. When K is zero, the arm X will contact the winding at B.

To recapitulate, application of a series of any number of pulses between 1 and 63 to the counting circuit will cause the shaft of the commutator (as indicated by arm X), to take a position with respect to the line OB such that the angle between OB and X bears the same linear relationship to 360°, or one complete revolution, as the number does to 256. Operation of relay R7 transfers the servo amplifier 81 from arm X and ground to arm Y and ground. This causes arm Y to move to point E and thereby arm X is moved an additional 90°. Relay R7 thus corresponds to the number 64, or $2^6$ and extends the possible range of integers to 127.

Relay R8, in its de-energized condition will complete a circuit from voltage source 65, line 77, bridge 8c, line 76 to tap P1 of the primary 66 of transformer T, through center tap P2 and line 72 back to the high side of voltage source 65. Upon energizing relay R8, bridge 8c moves to engage the right contacts of said relay R8 and completing a circuit from voltage source 65, line 77, bridge 8c, line 73, to tap P3 of primary 66, center tap P2, through line 72 to the high side of voltage source 65.

Thus, operation of relay R8 changes the phase of all secondary windings by 180°. This results in point C being at a potential of $+\frac{1}{2}(64-K)E$; D at $$+\frac{K}{2} \times E$$

A at $-\frac{1}{2}(64-K) \times E$; and B at $$+\frac{K}{2} \times E$$

As a result the servo system will cause arm X (or Y) to come to rest at point F. This, in effect, adds 180° or $128/256$ of a complete revolution to any previous setting. Relay R8, therefore, corresponds to the number 128 or $2^7$ and extends the range of integers to 255. 256 pulses applied to the counting circuit would restore it to the zero condition and result in the release of all relays, causing the shaft to take the zero position, corresponding to one complete revolution.

The voltage patterns and resultant positions taken by arms X and Y are shown graphically in Fig. 2, for several values of K. It is noted that each circle at the left represents the commutator 90 for different values of K, wherein the arm (X or Y) in solid line indicates the arm momentarily connected to the servo amplifier 81 and the arm in dotted lines indicates the arm momentarily not connected to said amplifier 81. In addition, the arrows shown in the voltage patterns indicate the direction in which the particular arm connected to the servo amplifier 81 will be moved by the servo drive motor 82 when said arm is removed from the point of zero potential.

As examples, if it were desired to cause the shaft to assume a position of 58°, the number of pulses transmitted would be $58/360 \times 256$ or 41.24. The nearest integer is 41. The corresponding binary number is $$1 \times 2^5 + 0 \times 2^4 + 1 \times 2^3 + 0 \times 2^2 + 0 \times 2^1 + 1 \times 2^0$$

A series of 41 pulses applied to the counting circuit would cause voltages to be applied to relays R6, R4, and R1. Operation of these relays would add the voltages of secondaries 201, 208, and 232 in series to circuit VB and subtract those of secondaries 101, 108 and 132 from the $64 \times E$ volts normally in circuit VA. The respective voltages would be $41 \times E$ and $23 \times E$. Arm X would assume a position $41/64 \times 90°$ or 57° 39′ 22.5″ from the zero position.

If the desired position were 148° then the pulses required would be $148/360 \times 256$ or 105.24. The nearest integer is 105. In the binary code this would be $$1 \times 2^6 + 1 \times 2^5 + 0 \times 2^4 + 1 \times 2^3 + 0 \times 2^2 + 0 \times 2^1 + 1 \times 2^0$$

The counting circuit would apply voltages to relays R7, R6, R4, and R1. Voltage VB would again be 41E and VA would be 23E. But since operation of relay R7 causes the servo mechanism to respond to signals from arm Y, this arm assumes a position 57° 39′ 22.5″ from B, while arm X moves to a position 147° 39′ 22.5″ from B.

For a desired position of 238° the nearest integral number of pulses would be 169, the binary code number would be $$1 \times 2^7 + 0 \times 2^6 + 1 \times 2^5 + 0 \times 2^4 + 1 \times 2^3 + 0 \times 2^2 + 0 \times 2^1 + 1 \times 2^0$$

The operated relays would be R8, R6, R4, and R1. Voltages VB and VA would again be 41E and 23E, respectively, but would be reversed in phase due to the operation of relay R8. Since relay R7 is not operated, the servo mechanism responds to signals from arm X which now takes a position 57° 39′ 22.5″ from D or 237° 39′ 22.5″ from OB.

Finally, if the desired position is 328°, the nearest integral number of pulses would be 233, the binary code number would be $$1 \times 2^7 + 1 \times 2^6 + 1 \times 2^5 + 0 \times 2^4 + 1 \times 2^3 + 0 \times 2^2 + 0 \times 2^1 + 1 \times 2^0$$

The operated relays would be R8, R7, R6, R4, and R1. The voltages VB and VA would again be 41E and 23E, respectively, but reversed in phase due to the operation of R8. Operation of R7 connects the servo amplifier to arm Y, which assumes a position 237° 39′ 22.5″ from B. Therefore, arm X would be 90° further advanced or 327° 39′ 22.5″ from OB.

It is apparent from the foregoing description that there is an error of 20′ 37.5″ between the actual position of the shaft and the desired position. This is due to the fact that the system can accommodate only integral numbers. The maximum number is 256. Each integral step, therefore, corresponds to an angle of 1° 24′ 22.5″. The maximum error would be 42′ 11.25″. This error is comparable to that inherent in many aircraft instruments. Moreover, it is a known error and can be compensated for in many cases at the control, or transmitting station.

The resistors 10 and 11 should be equal within a high degree of accuracy (0.1%). The same is true of resistors 12 and 13. The actual resistance value is not critical. It should be large enough so that the transformer windings will not be appreciably loaded. The value used for the present model is 5000 ohms for each resistor. The common junction point (ground) of the four resistors 10, 11, 12 and 13, forms a reference point to which other voltages in the network are compared.

The power supply 65, which is applied to the primary 66 of transformer T, is 115 volts A. C., at 400 cycles, while the relays are actuated by 24 volts D. C. The resistance across each pair of taps A and C, and taps B and D is approximately 2500 ohms, while the actual voltage of magnitude 32E (induced in either secondary windings 132 or 232) is approximately 26 volts. All the aforementioned values of the circuit components are not critical and may be varied to suit the requirements of a particular device or system.

Any of a number of conventional "flip-flop" or "trigger" circuits (not shown) may be substituted for relays R1 to R8 to considerably shorten the time constant of the present device.

The rotor of servo drive motor 82 is commonly connected through shaft 83 to an actuator control 86. Said actuator control 86 will thereupon turn, for example, an aircraft rudder so as to cause the aircraft to turn until its heading corresponds to the position indicated by the transmitted pulse signal.

The counting circuit must be so designed that it maintains the voltages set up for one pulse signal until a new signal is received. It should then set up new voltage signals to correspond to the new pulse signal.

The voltage patterns set up by the voltages at the taps A, B, C, and D are such that the commutator shaft always changes from one position to another by the shortest path.

The present device was designed to work in conjunction with a "zero reader." The binary number furnished to said device corresponds to a desired heading for an aircraft. In this arrangement, the rotor of a synchro motor 88 and a dial 87 calibrated in degrees from 0° to 360° are also fixed to and rotate with shaft 83. The stator of said synchro motor is connected to a gyrosyn compass 89. The dial 87, therefore, indicates the desired heading and the rotor of synchro motor 88 transmits a signal corresponding to the difference between the desired heading and the actual heading to a correction indicator 97.

The device can be extended to any number of digits by inserting additional DPDT relays in the chain connected to the transformer T and adding secondaries to said transformer with proper voltage values. Obviously, one relay and two secondaries would be required for each additional binary digital representation.

For instance, the maximum number could be extended to 512 by adding another DPDT relay selectively connecting either of one of two additional secondary windings in circuit. Each of said windings should be wound so as to produce a voltage of 64E and be connected in series, one to the chain or variable voltage VA and the other to the chain of VB. The new relay would correspond to the binary digit $2^6$, while the shuttle relay would correspond to $2^7$ and the phase reversing relay to $2^8$. The circle would be divided into 512 parts, each step corresponding to 42' 11.25" and the maximum inherent error would be reduced to about 21' 6".

Reversal of the direction of rotation of the system may be accomplished by interchanging the connections to arms X and Y and also the connections to taps A and C.

The device is linear with respect to the number furnished to it, so that the angular position of the servo drive motor 82 will be directly proportional to the magnitude of the digital count applied to the system by means of the pulse signals. Its accuracy is dependent upon the care in which the parts are made, the accuracy of the ratio of turns of the transformer secondaries, the accuracy of equality of the resistor pairs 10, 11 and 12, 13, and the sensitivity of the servo system. The actual value of the voltage input is not important; however, the relative values of voltages induced in the transformer secondaries are critical. The range of values chosen will be dependent upon the requirements of the servo amplifier 81. The points A, B, C, and D of the commutator 90 must be accurately spaced 90° apart. Accuracy of linearity is required only on sections DA and BC.

Although this invention has been disclosed and illustrated with reference to particular application, the principles involved are adaptable to numerous other applications which will appear apparent to persons skilled in the art. The invention is, therefore, to be limited only as indicated by the scope of the appended claims.

I claim:

1. An apparatus for decoding electrical pulses comprising a pulse input means, voltage-controlling means operated by said pulse input means, said voltage-controlling means including a pair of cross-complementary voltage-determining components, voltage-apportioning means responsive to the mutually reciprocal action of said cross-complementary components, and servo loop means responsive to the voltage resulting from the operation of said voltage-apportioning means for determining the cycle of operation of said servo loop means.

2. An apparatus as defined in claim 1, wherein the voltage-controlling means includes a transformer, and each of said voltage-determining components comprises a plurality of differently and predeterminately wound series-connected secondary sections of said transformer.

3. An apparatus as defined in claim 2, wherein the turns-ratio between successive secondary sections is such as to establish a geometric progression.

4. An apparatus as defined in claim 3, wherein said geometric progression is in the form of a binary series.

5. An apparatus as defined in claim 4, wherein one of said voltage-determining components comprises an additional secondary winding which is wound so as to induce a voltage equal to the lowest order increment of said binary series.

6. An apparatus as defined in claim 5, wherein said additional secondary winding transmits a voltage to said voltage-apportioning means independent of the operation of said voltage-controlling means.

7. An apparatus as defined in claim 1, wherein the voltage-controlling means comprises a plurality of switch means, a source of voltage to be controlled, and means for operating said switch means in such a manner as to regulate the magnitude of each of said pair of cross-complementary voltage-determining components as transmitted from said source of voltage to be controlled in response to said pulse input means.

8. An apparatus as defined in claim 7, wherein said voltage-apportioning means comprises a commutator-resistor network and means for connecting said voltage-determining components to alternately and equally spaced points of said network.

9. An apparatus as defined in claim 8, wherein said voltage-apportioning means also includes a pair of arms angularly spaced 90° apart and insulated from one another, said arms being centrally pivotable with respect to said commutator at their divergent outer ends, a shuttle switch means for selectively connecting either of said arms to actuate said servo loop means in response to predetermined signal from said pulse input means, said servo loop means comprising a servomotor, and a mechanical linkage between said servomotor and the inner pivotable ends of said arms, whereby said voltage-apportioning means transmits a voltage to operate said servomotor which in turn rotates said mechanical linkage and said arms until said voltage transmitted by said arms becomes zero and the servo loop means is at rest.

10. The apparatus as defined in claim 9, including additional switching means to cause the phase of the voltage induced in said voltage-determining components to be controlled by whatever signal is transmitted by said pulse input means.

11. The apparatus as defined in claim 10, wherein said voltage-controlling means includes a transformer having a center-tapped primary, said additional switching means being operative to reverse the phase of voltage induced in said transformer by applying primary voltage source in one portion or the other of said center-tapped primary.

12. The apparatus as defined in claim 11, wherein each of said voltage-determining components comprises a series of secondary sections of said transformer which are wound so as to be representative of a binary progression, and wherein one of said components includes an additional secondary winding having a predetermined turns-ratio in relation to the windings of the particular secondary section that is representative of the lowest increment of said binary progression, said additional winding being operative independently of the action of said switch means.

References Cited in the file of this patent

UNITED STATES PATENTS 2,715,703    Schuck _____ Aug. 16, 1955